INVENTORS.
Christopher Nuss,
Thomas A. Unckrich.
BY
Harness & Harris
ATTORNEYS.

United States Patent Office 3,163,006
Patented Dec. 29, 1964

3,163,006
FLOW CONTROL DEVICE
Christopher Nuss, Roseville, and Thomas A. Unckrich, Detroit, Mich., assignors to Chrysler Corporation, Highland Park, Mich., a corporation of Delaware
Filed Jan. 24, 1964, Ser. No. 340,007
7 Claims. (Cl. 60—52)

This invention relates to improvements in a fluid flow control device particularly adapted for use in metering the rate of flow of pressurized fluid to a hydraulically acuated power steering gear for an automobile.

It is customary to supply pressurized fluid to an automobile power steering gear by means of a pump driven by the automobile engine, such that the pump is operated at maximum speeds and is capable of delivering its maximum power when the automobile is cruising at high speed along the highways. The power steering gear on the other hand is ordinarily under maximum load and requires maximum power from the pump when the automobile is operating at low speeds, as for example during a parking maneuver.

It has been customary to strive for a "drooper" effect in the rate of flow of pressurized fluid from the steering gear pump, such that as the vehicle engine speed increases, the rate of flow of pressurized fluid decreases. This effect is only partially satisfactory because the minimum steering power is not always required at high vehicle speeds, as is evident during a front tire blow-out or when one front wheel suddenly runs onto a soft shoulder of the road. The actual relationship between steering power and vehicle operation requires steering power proportional to steering load, independently of engine speed.

It is accordingly an object of the present invention to provide an improved flow control device suitable for use with an automobile steering gear, which supplies pressurized fluid to the gear at an increasing pressure and rate of flow as the steering load increases, regardless of engine speed.

Inasmuch as the hydraulic power to the steering gear is proportional to the product of the fluid pressure and the rate of fluid flow, by increasing the rate of flow as the pressure increases, the necessary steering power can be supplied at a lower fluid pressure than is otherwise necessary when the rate of fluid flow is maintained substantially constant. Thus the power steering gear can be operated at lower maximum pressures than has been feasible heretofore, with consequent reduced costs and rates of wear for both the steering gear and pump.

In order to prevent damage to the mechanism in the event that the load on the steering gear should tend to exceed a predetermined safe value, a pressure relief safety valve is usually employed in parallelism with the fluid power line to the steering gear. Such a pressure relief valve, though essential, adds to the cost of the system. It is accordingly another object to provide a flow control device of the above character which provides an inherent pressure relief safety feature at no extra or, at most, nominal cost.

Other objects of this invention will appear in the following description and appended claims, reference being had to the accompanying drawings forming a part of this specification wherein like reference characters designate corresponding parts in the several views.

Figure 1:
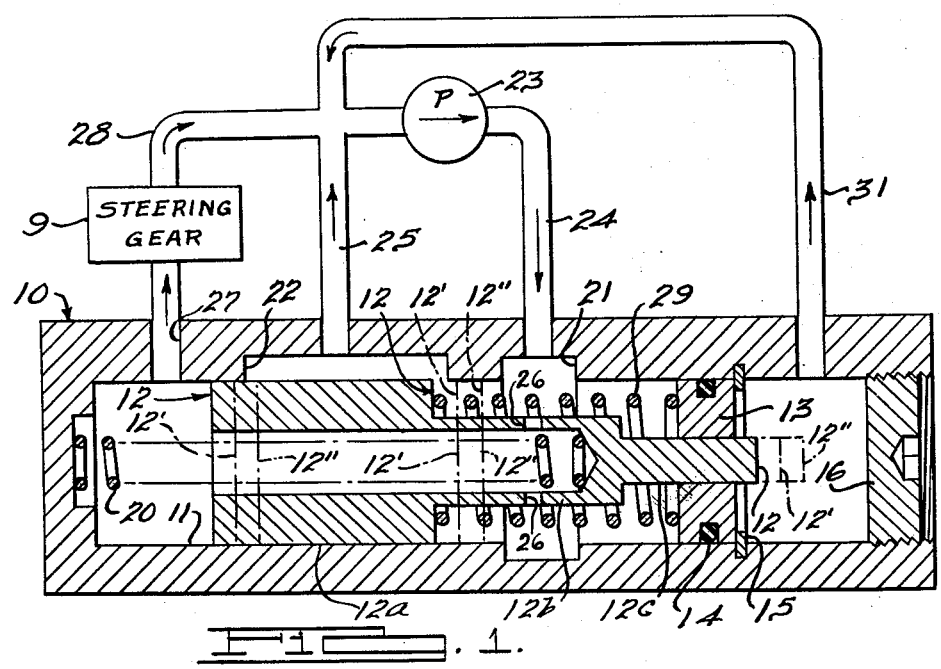
FIGURE 1 is a schematic cross-sectional view taken axially along the mid-region of a flow control device embodying the present invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings a particular embodiment of the present invention is illustrated by way of example in a flow control device particularly suitable for use in supplying pressurized fluid to an automobile power steering gear 9. The flow control device comprises a valve housing 10 containing a cylindrical bore or valve chamber 11 for an axially slidable spool valve 12. The latter is provided with an enlarged land portion 12a at its left end which completely fills the cross sectional area of the bore 11 and slidably engages the latter in fluid sealing relationship to block axial flow of pressurized fluid from one end of the valve 12 to the other.

The land 12a terminates in an integral cylindrical extension 12b of reduced diameter, which in turn terminates in an integral axially extending cylindrical guide 12c of still further reduced diameter. The guide 12c extends slidably in fluid sealing and guided relationship through the central bore of an annular closure 13. A seal 14 is provided around the periphery of closure 13 between the latter and the interior side wall of bore 11, whereby the right end of valve chamber 11 is sealed against loss of pressurized fluid. A C-shaped spring clip 15 recessed partially into the interior wall of bore 11 adjacent the exterior of closure 13 retains the latter against endwise movement when subject to pressure as described below. By this construction, the valve 12 is supported and guided at its opposite ends 12a and 12c. Spaced axially endwise from the closure 13 is an outer plug 16 which may be suitably screwed into the end of bore 11 to provide an outer closure therefor.

The spool valve 12 is provided with an axial bore 19 opening at its left end and containing a coil spring 20 under compression between the portion of the valve 12 at the base or right end of bore 19 and an end wall of the housing 10 closing the left end of chamber 11. Extending radially through the side wall of housing 10 into the chamber 11 is an inlet port 21 at the region of the reduced extension 12b and a bypass port 22 spaced axially leftward of the port 21. A source of fluid pressure which may comprise a pump 23 is connected with the ports 21 and 22 respectively by an inlet line 24 and an exhaust or return line 25.

The reduced extension 12b is provided with a plurality of restricted metering ports 26 at the region of the inlet port 21, whereby fluid pumped from pump 23 enters chamber 11 via port 21 and thence passes through metering ports 26 to the interior of bore 19 and to the left end of chamber 11, from whence the metered fluid is discharged via operating port 27 to a fluid actuated device, as for example the fluid actuated automobile power steering gear 9. The actuating fluid exhausted from gear 9 can be returned via conduit 28 to the inlet of pump 23. Where desired, a spring 29 may be employed under compression between the right end of land 12a and closure 13 to cooperate with spring 20 and urge the valve 12 to a rest position at or adjacent a closed position described below. A drain line 31 also connects the portion of bore 11 between closures 13 and 16 with the inlet of pump 23.

In operation of the device shown, springs 20 and 29 are effffective to urge spool valve 12 toward a closed position indicated by the dotted lines 12' whereat land 12a closes bypass port 22 from the interior of chamber 11. Upon operation of pump 23, pressurized fluid entering chamber 11 via port 21 passes through metering ports 26 and operating port 27 to the steering gear 9. The metering ports 26 are dimensioned to pass metered fluid at a predetermined rate of flow in the neighborhood of 2 gallons per minute. When the rate of flow of fluid discharged from pump 23 exceeds the rate of metered flow through ports 26, pressure will build-up at the right side of land 12a and urge valve 12 leftward against the force of spring 20 to the open position illustrated by solid lines, thereby to connect port 21 with the right edge of port 22 and return the excess pump capacity to the inlet side of the pump 23.

During normal straight-ahead steering, the fluid pressure required to operate the steering gear 9 will be a minimum, so that the pressure at port 27, i.e. the pressure in chamber 11 at the left end of valve 12, will likewise be a minimum and the pressure drop across metering ports 26 will be determined primarily by the force required to compress spring 20 by moving valve 12 leftward from the closed position 12' to the open position illustrated. Thus the pressure drop across metering ports 26 will also be a minimum and the rate of fluid flow therethrough will be a minimum as required for operation of the steering gear 9 during low reaction conditions of straight-ahead steering for example.

When the steering gear 9 is operating under heavier loads, so as to increase the back pressure at port 27 and in chamber 11 at the left end of valve 12, as for example during a parking maneuver or steering in heavy sand, a faster steering response and a correspondingly greater rate of flow through metering ports 26 is desired. In order to increase the pressure differential across metering ports 26 and thereby to increase the rate of metered fluid flow therethrough as the power requirement of the steering gear 9 increases, the fluid pressure applied to the steering gear 9, i.e. downstream of metering ports 26, is also applied to the left end of valve 12 to supplement the force of spring 20 urging valve 12 toward the closed position.

The pressure force at the left end of valve 12 is opposed by the pressure within chamber 11 at the right end of valve 12. However, the effective area of the left end of valve 12 subject to the pressure at port 27 is greater than the effective area of the right end of valve 12 subject to the pressure of port 21 by an amount equal to the diametrical cross sectional area of guide extension 12c. In consequence, as the pressure at port 27 increases with an increasing power demand from the steering gear 9, the force urging valve 12 rightward to the closed position 12' will increase. In order to force the valve 12 to the open position 12, so as to by-pass the excess pump capacity, the pressure at port 21 acting on the smaller effective area at the right end of valve 12 will necessarily increase with respect to the pressure acting on the larger left end of valve 12. Inasmuch as the latter pressure equals the pressure within bore 19, the pressure drop across metering ports 26 will be increased and the rate of fluid flow therethrough will be increased as required by the increased power demand from the steering gear.

Spring 29 is comparatively light in weight and is employed primarily to cooperate with spring 20 in centering valve 12 at the closed position 12' when no fluid pressures are acting on the valve. Accordingly a first approximation of the relationship between the forces acting on valve 12 is illustrated by the equation:

(1) $\qquad S+A(P-P')=aP$ where

S is the force of spring 20,
A and $a$ are the effective cross sectional areas at the left and right ends respectively of valve 12,
P is the fluid pressure at port 21, and
P' is the fluid pressure differential across ports 26. Thus (2) $\qquad AP'=S+P(A-a)$ A, $a$ and S are constant. Therefore, P' increases as P increases. For small values of P, S controls the value of P'. As P increases in value, it tends to dominate the value of P'.

Figure 2:
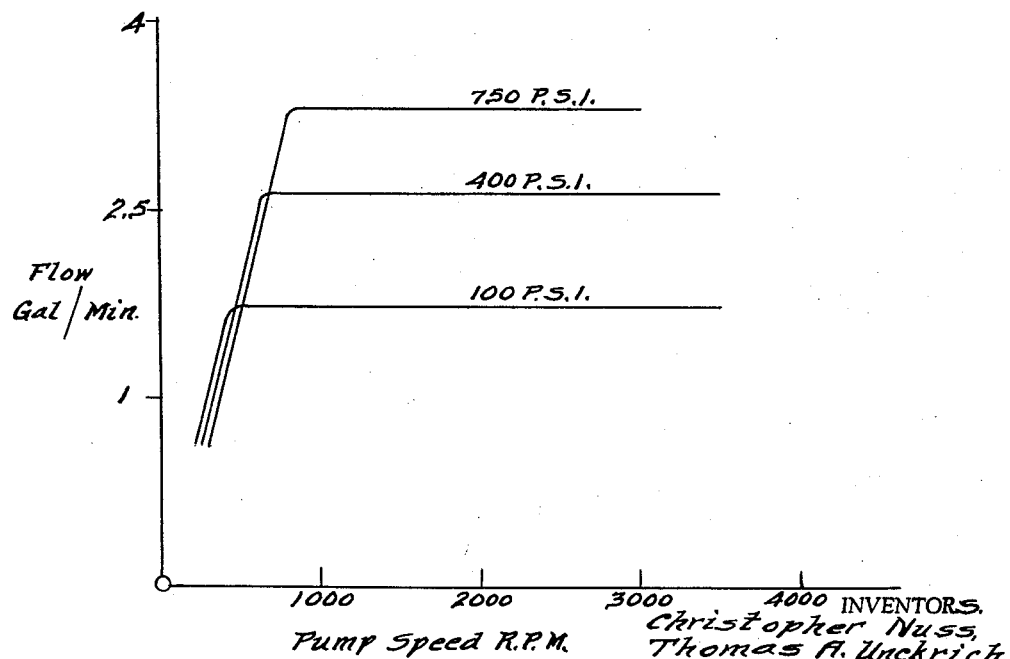
FIGURE 2 is a graphic representation of a family of curves at different operating pressures showing the fluid flow in gallons per minute on the ordinate and the pump speed in revolutions per minute on the abscissa.

As illustrated in FIGURE 2, when the reaction pressure of the steering gear is 100 p.s.i. valve 12 will move to the open position when the pressure drop across ports 26 is such as to cause a flow of slightly less than two gallons per minute. When the steering reaction approaches a higher value of for example 750 p.s.i., the pressure drop across metering ports 26 will increase to effect a metered flow therethrough of a little more than three gallons per minute.

By virtue of the lower rate of metered flow through the ports 26 when the steering is under comparatively low load, as for example during straight-ahead steering, it is feasible to design the valve 12 and ports 26 so as to achieve a substantially uniform rate of metered flow through ports 26 with increasing pump speed, as illustrated in FIGURE 2. Inasmuch as the flow control device automatically achieves an increased rate of metered flow through the ports 26 with increasing steering load, there is no need to strive for the heretofore customary "drooper" effect whereby the rate of metered flow decreases with increased pump speed. The rate of metered flow to the steering gear 9 will at all times be a direct function of the power demands of the steering gear, regardless of the pump speed.

Although the spring 20 is desirable in a flow control device for use in an automobile power steering gear in order to predetermine the desired minimum rate of metered fluid flow to the steering gear under conditions of nominal steering load, the spring 20 is otherwise unnecessary to the operation of the device. As long as a small back pressure exists in the bypass port 22, this pressure will be applied through ports 26 to the left end of valve 12 to urge the latter rightward toward the closed position in the absence of spring 20. Thereafter, a pressure increase at port 27 resulting from the power demand of an hydraulically actuated tool connected to port 27 will result in an increased force tending to close valve 12 and a correspondingly increased pressure drop across ports 26 as described above.

In the event that the steering reaction force should continue to increase while valve 12 is at the closed position 12', the pressure at port 27 will likewise increase and urge valve 12 further to the right. Finally, at a predetermined maximum safe pressure, valve 12 will be moved to the safety or pressure relief position indicated by the dotted lines 12''. At this position, the left end of bypass port 22 will be in communication with port 27 to permit a portion of the high pressure fluid to bypass the steering gear 9 and return to the inlet of pump 23, thereby to prevent further pressure buildup. At these high pressures, the influence of spring 29 will be nominal. It is therefore apparent that spring 29, like spring 20, is not essential to operation of the device and is only employed where desired for convenience.

We claim:

1. In a flow control device, an inlet port, a restricted metering port in communication with said inlet port for discharging metered fluid therefrom at reduced pressure to a downstream side of said port, a bypass port, valve means cooperable with said ports and shiftable to a closed position for closing said bypass port to both said inlet and metering ports, said valve means being shiftable in one direction from said closed position to an open position for closing said bypass port to said downstream side of said metering port and for opening said bypass port to said inlet port, said valve means being shiftable in the direction opposite said one direction from said closed position to a relief position for opening said bypass port to said downstream side of said metering port and for closing said bypass port to said inlet port, said valve means having first and second effective areas arranged in opposition to each other and adapted to be exposed to fluid pressure to cause shifting of said valve means in said one direction and the opposite respectively, and means for connecting said inlet port and the downstream side of said metering port to said first and second areas respectively, said first area being smaller than said second area.

2. In a flow control device, an inlet port, a restricted metering port in communication with said inlet port for discharging metered fluid therefrom at reduced pressure to a downstream side of said port, a bypass port, valve means cooperable with said ports and shiftable to a closed position for closing said bypass port to both said inlet and metering ports, said valve means being shiftable in one direction from said closed position to an open position for closing said bypass port to said downstream side of said metering port and for opening said bypass port to said inlet port, said valve means being shiftable in the direction opposite said one direction from said closed position to a relief position for opening said bypass port to said downstream side of said metering port and for closing said bypass port to said inlet port, said valve means having first and second effective areas arranged in opposition to each other and adapted to be exposed to fluid pressure to cause shifting of said valve means in said one direction and the opposite respectively, means for connecting said inlet port and the downstream side of said metering port to said first and second areas respectively, said first area being smaller than said second area, and resilient means yieldingly urging said valve means to said closed position and yieldingly resisting shifting of said valve means in said one and the opposite directions from said closed position.

3. In a flow control device, an inlet port, a restricted metering port in communication with said inlet port for discharging metered fluid therefrom at reduced pressure to a downstream side of said port, a bypass port, valve means cooperable with said ports and shiftable to a closed position for closing said bypass port to both said inlet and metering ports, said valve means being shiftable in one direction from said closed position to an open position for closing said bypass port to said downstream side of said metering port and for opening said bypass port to said inlet port, said valve means being shiftable in the direction opposite said one direction from said closed position to a relief position for opening said bypass port to said downstream side of said metering port and for closing said bypass port to said inlet port, said valve means having first and second effective areas arranged in opposition to each other and adapted to be exposed to fluid pressure to cause shifting of said valve means in said one direction and the opposite respectively, means for connecting said inlet port and the downstream side of said metering port to said first and second areas respectively, said first area being smaller than said second area, and resilient means yieldingly urging said valve means to a predetermined position with respect to said ports.

4. In a flow control device, a housing containing a valve chamber, a valve element shiftable in one direction and the opposite within said chamber and partitioning said chamber into two parts, said element having effective areas at opposite sides within said chamber adapted to be exposed to fluid pressure in one and the other of said two parts respectively to shift said element in said one direction and the opposite respectively, the effective area of said element exposed to the fluid pressure in said one part being smaller than the effective area of said element exposed to the fluid pressure in said other part, an inlet port in communication with said one part for discharging pressurized fluid thereto to urge said element in said one direction, a restricted metering port connecting said two parts for discharging said pressurized fluid at reduced pressure into the other of said two parts to urge said element in said opposite direction, bypass means in communication with said chamber, said element being shiftable to a closed position and being cooperable with said bypass means at said closed position to close the communication between said bypass means and chamber, said element being shiftable in said one direction or the opposite from said closed position to connect said bypass means with said one part or the other respectively.

5. In the combination according to claim 4, said valve element comprising a spool valve shiftable axially in said one direction and the opposite, said metering port extending through said valve element to connect said two parts, and resilient means yieldingly urging said spool valve toward said closed position, said spool valve having a cylindrical guide extending axially in said opposite direction through an end wall of said housing in sliding and fluid sealing engagement with said end wall, the effective area of said element exposed to the fluid pressure in said one part being smaller than the effective area of said element exposed to the fluid pressure in said other part by an amount equal to the cross sectional area of said guide taken perpendicularly to said axial directions.

6. In a flow control device, a housing containing a spool valve chamber, a spool valve shiftable axially in one direction and the opposite within said chamber and partitioning the latter into two parts, said valve having effective areas at axially opposite ends adapted to be exposed to fluid pressure in one and the other of said two parts respectively to shift said valve in said one direction and the opposite respectively, the effective area of said valve exposed to the fluid pressure in said one part being smaller than the effective area of said valve exposed to the fluid pressure in said other part, an inlet port in communication with said one part for discharging pressurized fluid thereto to urge said valve in said one direction, a restricted metering port connecting said two parts for discharging said pressurized fluid at reduced pressure into the other of said two parts to urge said valve in said opposite direction, bypass means in communication with said chamber, said valve being shiftable to a closed position and being cooperable with said bypass means at said closed position to close the communication between said bypass means and chamber, said valve being shiftable in said one direction or the opposite from said closed position to connect said bypass means with said one part or the other respectively, and resilient means yieldingly opposing shifting of said valve in said one direction from said closed position.

7. In an automobile steering control device, a fluid actuated power steering gear for said automobile, a source of pressurized fluid for said steering gear comprising a pump adapted to be operated by the engine of said automobile and having an inlet and an outlet, a housing containing a valve chamber, a valve element shiftable in one direction and the opposite within said chamber and partitioning said chamber into two parts, said element having effective areas at opposite sides within said chamber adapted to be exposed to fluid pressure in one and the other of said two parts respectively to shift said element in said one direction and the opposite respectively, the effective area of said element exposed to the fluid pressure in sad one part being smaller than the effective area of said element exposed to the fluid pressure in said other part, an inlet port connecting said pump outlet and said one part for discharging pressurized fluid thereto to urge said element in said one direction, a restricted metering port connecting said two parts for discharging said pressurized fluid at reduced pressure into the other of said two parts to urge said element in said opposite direction, bypass means connecting said chamber and pump inlet, said element being shiftable to a closed position and being cooperable with said bypass means at said closed position to close the communication between said bypass means and chamber, said element being shiftable in said one direction or the opposite from said closed position to connect said bypass means with said one part or the other respectively, and resilient means yieldingly opposing shifting of said element in said one direction from said closed position.

References Cited in the file of this patent
UNITED STATES PATENTS

| | | |
|---|---|---|
| 2,737,196 | Eames | Mar. 6, 1956 |
| 2,802,674 | Jackson | Aug. 13, 1957 |
| 2,995,141 | Hipp | Aug. 8, 1961 |